United States Patent
Saito et al.

(10) Patent No.: US 9,091,907 B2
(45) Date of Patent: Jul. 28, 2015

(54) PROJECTOR APPARATUS HAVING A REFLECTOR ARRANGED TO COVER A LIGHT-EMITTING TUBE WHICH PROVIDES HIGH COOLING EFFICIENCY

(75) Inventors: Masahiro Saito, Shizuoka (JP); Daiki Fujiwara, Shizuoka (JP)

(73) Assignee: Sony Corporation, Tokyo (JP)

( * ) Notice: Subject to any disclaimer, the term of this patent is extended or adjusted under 35 U.S.C. 154(b) by 557 days.

(21) Appl. No.: 12/931,787

(22) Filed: Feb. 10, 2011

(65) Prior Publication Data

US 2011/0199583 A1 Aug. 18, 2011

(30) Foreign Application Priority Data

Feb. 18, 2010 (JP) ................................ P2010-033490

(51) Int. Cl.
G03B 21/26 (2006.01)
G03B 21/16 (2006.01)
H04N 9/31 (2006.01)

(52) U.S. Cl.
CPC .............. G03B 21/16 (2013.01); H04N 9/3144 (2013.01); H04N 9/3197 (2013.01)

(58) Field of Classification Search
CPC ..... G03B 21/16; H04N 9/3197; H04N 9/3144
USPC ........... 353/57, 58, 59, 60, 61, 52, 74, 75, 98, 353/119, 122; 362/294, 296.01, 341, 345, 362/373; 348/744, 748, 749; 349/61, 62, 349/161; 352/202; 359/385, 395; 250/208.1, 216, 239
See application file for complete search history.

(56) References Cited

U.S. PATENT DOCUMENTS

| D420,455 S | * | 2/2000 | Haba et al. | ........................ D26/1 |
| 6,398,366 B1 | * | 6/2002 | Hara et al. | ...................... 353/57 |
| 6,976,760 B2 | * | 12/2005 | Ito et al. | ......................... 353/61 |
| 7,014,322 B2 | * | 3/2006 | Okoshi | .......................... 353/61 |

(Continued)

FOREIGN PATENT DOCUMENTS

| CN | 1405622 A | 3/2003 |
| CN | 101135425 A | 3/2008 |

(Continued)

OTHER PUBLICATIONS

Office Action from Japanese Application No. 2010-033490, dated Oct. 29, 2013.

(Continued)

*Primary Examiner* — Pascal M Bui Pho
*Assistant Examiner* — Jennifer Bennett
(74) *Attorney, Agent, or Firm* — Sony Corporation

(57) ABSTRACT

A projector apparatus which may include a light-emitting tube emitting illumination light, a reflector arranged to cover at least a portion of periphery of the light-emitting tube and formed so as to reflect the illumination light emitted by the light-emitting tube in a forward direction, a cooling fan disposed beside the reflector for blowing cooling air on the light-emitting tube, and an apparatus housing containing the reflector and the cooling fan. The reflector may have an intake port facing an air discharging port of the cooling fan and two discharging ports opening in direction perpendicular to or substantially perpendicular to the intake port. The two discharging ports of the reflector may have a combined discharge area which is twice or substantially twice an intake area of the intake port of the reflector.

5 Claims, 5 Drawing Sheets

(56) References Cited

U.S. PATENT DOCUMENTS

| | | | |
|---|---|---|---|
| 7,147,349 B2* | 12/2006 | Kato et al. | 362/294 |
| 7,766,484 B2* | 8/2010 | Takeda et al. | 353/61 |
| 7,891,846 B2* | 2/2011 | Noda | 362/373 |
| 7,901,110 B2* | 3/2011 | Mulay et al. | 362/277 |
| 8,029,168 B2* | 10/2011 | Yamamoto et al. | 362/373 |
| 2010/0060862 A1* | 3/2010 | Minami | 353/61 |

FOREIGN PATENT DOCUMENTS

| | | | |
|---|---|---|---|
| JP | 2005-010505 A | | 1/2005 |
| JP | 2005274735 A | | 10/2005 |
| JP | 2006-243635 | * | 9/2006 |
| JP | 2006243206 A | | 9/2006 |
| JP | 2006259027 A | | 9/2006 |
| JP | 2007248760 A | | 9/2007 |
| JP | 2008310132 A | | 12/2008 |
| JP | 2009129622 A | | 6/2009 |
| JP | 2010033089 A | | 2/2010 |
| JP | 2010217284 A | | 9/2010 |

OTHER PUBLICATIONS

Office Action from Chinese Application No. 2011-10035897.8, dated Jun. 9, 2014.
Office Action from Japanese Application No. 2010-033490, dated Feb. 18, 2014.

* cited by examiner

PROJECTOR APPARATUS HAVING A REFLECTOR ARRANGED TO COVER A LIGHT-EMITTING TUBE WHICH PROVIDES HIGH COOLING EFFICIENCY

CROSS-REFERENCE TO RELATED APPLICATION

The present application claims priority from Japanese Patent Application No. JP 2010-033490 filed in the Japanese Patent Office on Feb. 18, 2010, the entire content of which is incorporated herein by reference.

BACKGROUND OF THE INVENTION

1. Field of the Invention

The present invention relates to a projector apparatus which optically enlarges an image on a small display device having a liquid crystal panel, a cathode ray tube, or the like and projects the enlarged image on a screen to display the enlarged image. More particularly, the invention relates to a projector apparatus in which a light-emitting tube (light source) emitting illumination light can be effectively cooled.

2. Description of the Related Art

For example, projector apparatus of the above-described type according to the related art include projectors as disclosed in JP-A-2005-10505 (Patent Document 1). Patent Document 1 discloses an illumination apparatus in which clouding of glass, deformation of a light-emitting tube, reduction of the life of the light-emitting tube, and degradation of image quality can be prevented. The patent document 1 also discloses a projector having such an illumination device. The illumination device disclosed in Patent Document 1 has a light-emitting tube emitting illumination light, and the illumination device is to be used in a projector which can project images with the projector housing turned upside down. The projector is also characterized in that it includes a cooling device for cooling the light-emitting tube by a downward air flow in either of a situation in which an image is projected with the projector housing in a normal setup and a situation in which an image is projected with the projector housing turned upside down from the normal setup.

Effects expected from the projector disclosed in Patent Document 1 include an advantageous mode of cooling in which a top half of the light-emitting tube can be sufficiently cooled while preventing a bottom half of the light-emitting tube from being over-cooled (paragraph [0019] of Patent Document 1).

SUMMARY OF THE INVENTION

In the above-described example of the related art, air for cooling the light-emitting tube is taken in through a communication hole provided one of side faces of a reflector, and the air is passed through a space inside the reflector where the light-emitting tube is disposed. The air is then removed through another communication hole provided on another side face of the reflector. Since the communication hole on the air intake side of the reflector and the communication hole on the air discharging side have the same size, there is a high air resistance on the air discharging side. This is problematic not only in that cooling efficiency is low but also in that it is difficult to keep the life of a light-emitting tube sufficiently long.

In the projector apparatus according to the related art, the communication hole on the air intake side of the reflector is identical in size to the communication hole on the air discharging side provided opposite thereto, and cooling is linearly passed from one communication hole toward the other communication hole. As a result, there is a high air resistance at the communication hole on the air discharging side, and the resistance reduces the speed of the air flow, which results in the problems of low cooling efficiency and difficulty in keeping the life of the light-emitting tube sufficiently long.

According to an embodiment of the invention, there is provided a projector apparatus including a light-emitting tube emitting illumination light, a reflector covering the periphery of the light-emitting tube and reflecting the illumination light emitted by the light-emitting tube in a forward direction, a cooling fan, and an apparatus housing. The apparatus housing contains the reflector and the cooling fan, and the cooling fan is disposed beside the reflector and to blow cooling air on the light-emitting tube. The reflector has an intake port facing an air discharging port of the cooling fan and two discharging ports opening in direction perpendicular to or substantially perpendicular to the intake port.

In the projector apparatus according to the embodiment of the invention, the reflector has one intake port and two discharging ports, and air taken into the reflector through the intake port is discharged through the two discharging ports provided to open in directions perpendicular or substantially perpendicular to the intake port. Therefore, the air discharging ports can be provided with a great area to keep air resistance at the air discharging side small, thereby allowing air to flow easily and allowing heat generated at the light-emitting tube to be easily released. Thus, high cooling efficiency can be achieved. Further, since resistance to air flow is suppressed at the discharging ports, loads imparted to the cooling fan can be kept small, and the power source for the fan can therefore be made compact.

DESCRIPTION OF PREFERRED EMBODIMENTS

In one embodiment of the invention, a reflector of a projector apparatus has one intake port and two discharging ports, and air taken into the reflector through the intake port is discharged through the two discharging ports provided to open in directions perpendicular or substantially perpendicular to the intake port. Therefore, the air in the air discharging side is allowed to flow easily and heat generated at a light-emitting tube is allowed to be easily released. Thus, cooling efficiency in the reflector can be improved, and loads imparted to a cooling fan can be reduced, thereby a projector apparatus whose power source can be made compact is implemented with a relatively simple structure.

Figure 1:
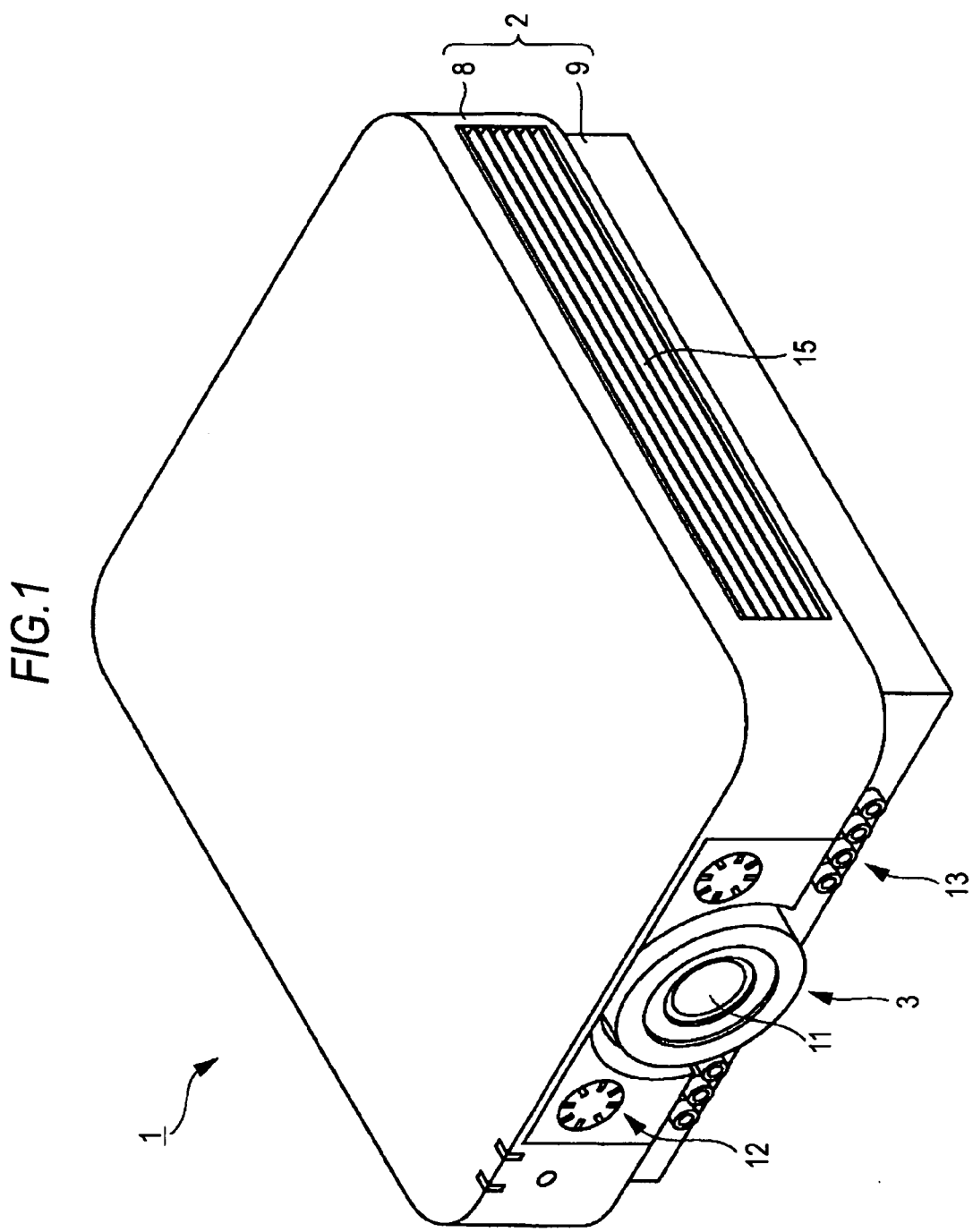
FIG. 1 is a perspective view of an embodiment of a projector apparatus according to the invention taken from a front side of the apparatus.
Figure 2:
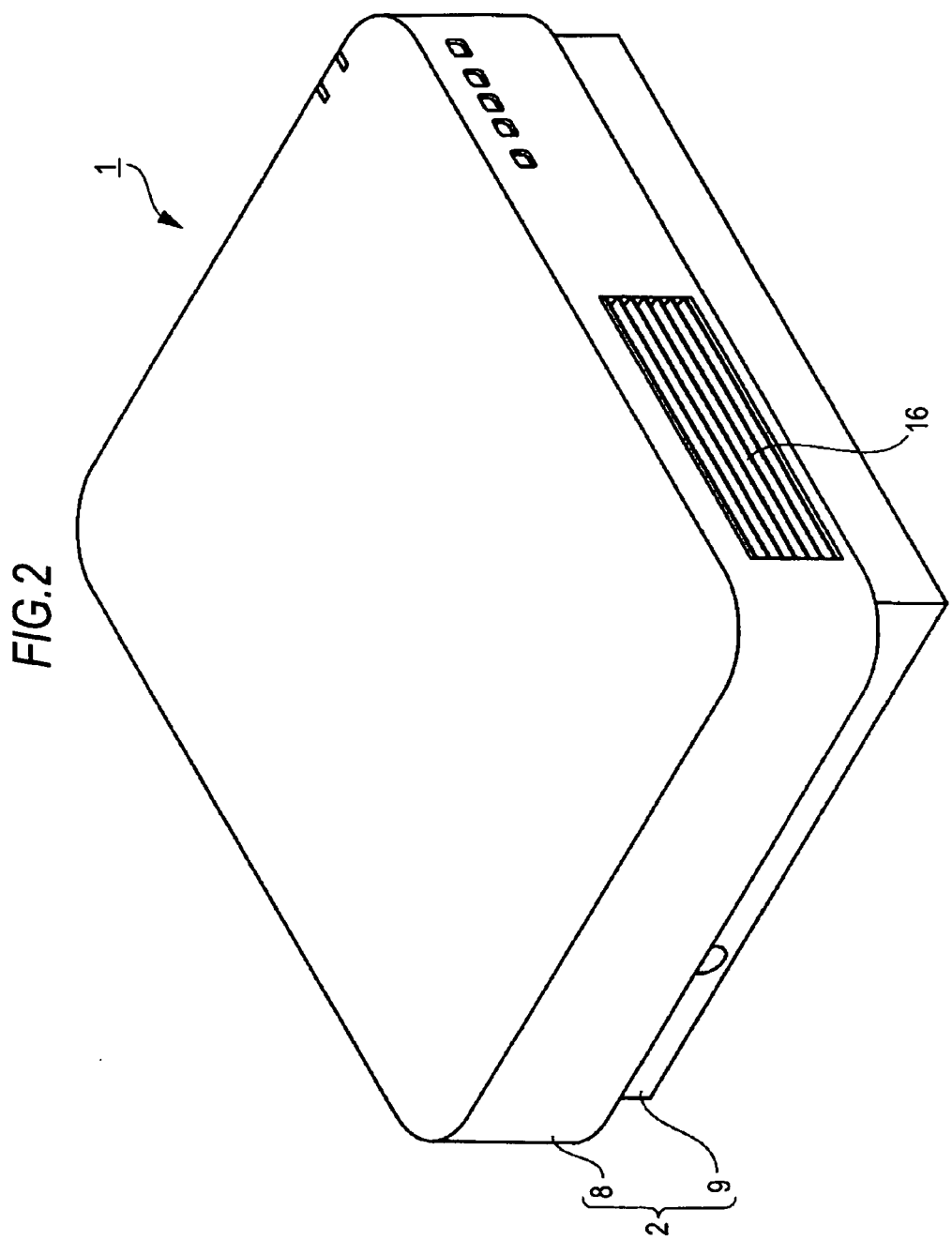
FIG. 2 is a perspective view of the embodiment of a projector apparatus according to the invention taken from a rear side of the apparatus.
Figure 3:
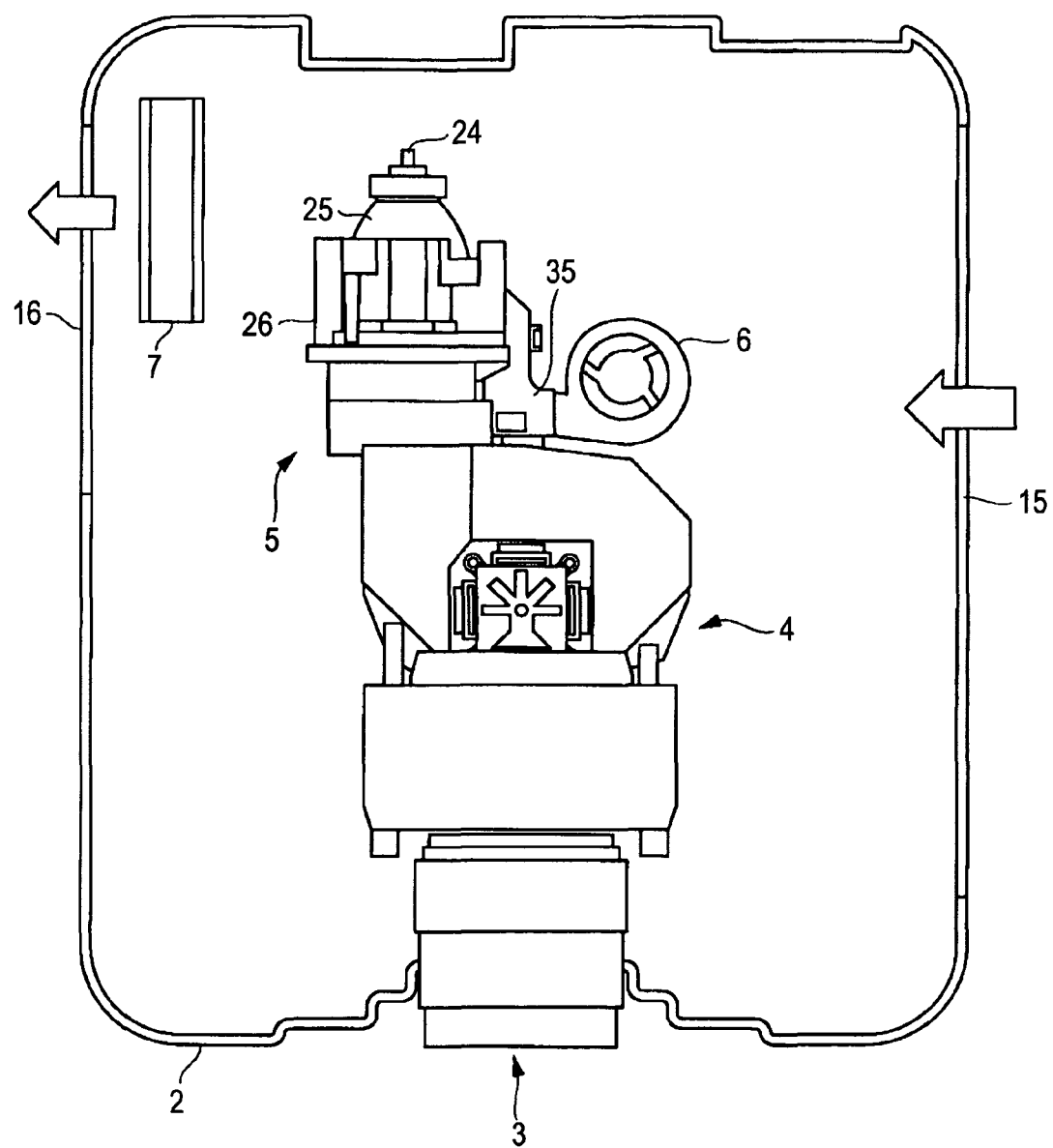
FIG. 3 is a plan view of the embodiment of a projector apparatus according to the invention taken with a top case of an apparatus housing omitted.

FIGS. 1 to 3 show an embodiment of a projector apparatus (image projecting apparatus) 1 according to the invention. The projector apparatus 1 includes an apparatus housing 2 constituting an outer case, a lens device 3 contained in the apparatus housing 2, a color separation optical device 4, an illumination device 5, a cooling fan 6, and an air discharging fan 7.

The apparatus housing 2 is formed by combining top and bottom parts, i.e., a top housing 8 and a bottom housing 9. The housings 8 and 9 in the combined state are fastened and secured to each other by a securing screw (not shown). The lens 11 facing the screen of the lens device 3 is exposed in the middle of a front face of the apparatus housing 2. Further, various elements are disposed on the front face of the apparatus housing 2, including a plurality of operation switches 12 such as a power switch, a volume switch, and a mode select switch and a plurality of connection terminals 13 such as connectors and plugs for electrically connecting the apparatus with external apparatus.

An air intake window 15 for taking external air into the apparatus housing 2 is provided on one side face of the top housing 8. The air intake widow 15 is formed by a plurality of elongated slots provided on the side of the top housing 8 such that they extend in a front-rear direction of the top housing. An air discharging window 16 for discharging internal air from the apparatus housing 2 is provided on another side face of the top housing 8. The air discharging window 16 is formed by a plurality of slots provided on the other side face of the top housing 8 such that they extend rearward from a point which is in the middle of the housing when viewed in the front-rear direction thereof. The air intake window 15 and the air discharging window 16 are not limited to such a structure formed by slots. The windows may alternatively be formed by disposing a multiplicity of holes in various shapes such as circular and square shapes in lines or at random. Further, the windows may alternatively be structures formed by mounting wire-mesh-like members inside openings. Other structures may obviously be employed.

As shown in FIG. 3, the lens device 3, the color separation optical device 4, the illumination device 5, the cooling fan 6, the air discharging fan 7, and a power supply unit and a controller (which are not shown) are contained in the apparatus housing 2. The lens device 3 is disposed in the middle of the front side of the apparatus housing 2 such that the optical axis of the lens system thereof extends in the front-rear direction of the housing, and a front end of the device protrudes from a through hole provided in the front face of the apparatus housing 2. The color separation optical device 4 is disposed on a rear surface of the lens device 3, and the illumination device 5 is disposed on one side of a rear surface of the color separation optical device 4. The cooling fan 6 is disposed on another side of the rear surface of the optical device 4 in a side-by-side relationship with the illumination device 5. The air discharging fan 7 is disposed in the apparatus housing 2 inwardly of the air discharging window 16.

Although not shown, the lens device 3 includes a plurality of lenses and a plurality of lens rings to which the lenses are mounted. One lens or two or more lenses can be moved in directions along the optical axis by rotating the lens rings to set the focus of the lens device 3 on the screen. The color separation optical device 4 includes a polarization conversion element for converting a light beam from the illumination device 5 into a parallel light beam, three liquid crystal panels serving as image forming elements for separating the parallel light beam into color light beams, i.e., a red light beam R, a green light beam G, and a blue light beam B and modulating the light beams, and a prism combining body for combining the modulated color light beams. The power supply unit supplies electric power to the color separation optical device 4, the illumination device 5, and the cooling fan 6. The controller controls the turning on/off of the light-emitting tube serving as a light source, drives the liquid crystal panels, and controls other devices and the apparatus.

The illumination device 5 emits illumination light, and the illumination light is passed through the color separation optical device 4 to project an image on the screen in an enlarged scale. The illumination device 5 includes a light-emitting tube 24 serving as a light source for emitting illumination light, a reflector 25 covering the light-emitting tube 24 and reflecting the illumination light emitted from the light-emitting tube 24 frontward, and a lamp housing 26 in which the reflector 25 is contained. For example, a high-pressure mercury lamp, a xenon lamp, a metal halide lamp, or a halogen lamp may be used as the light-emitting tube 24.

Figure 4:
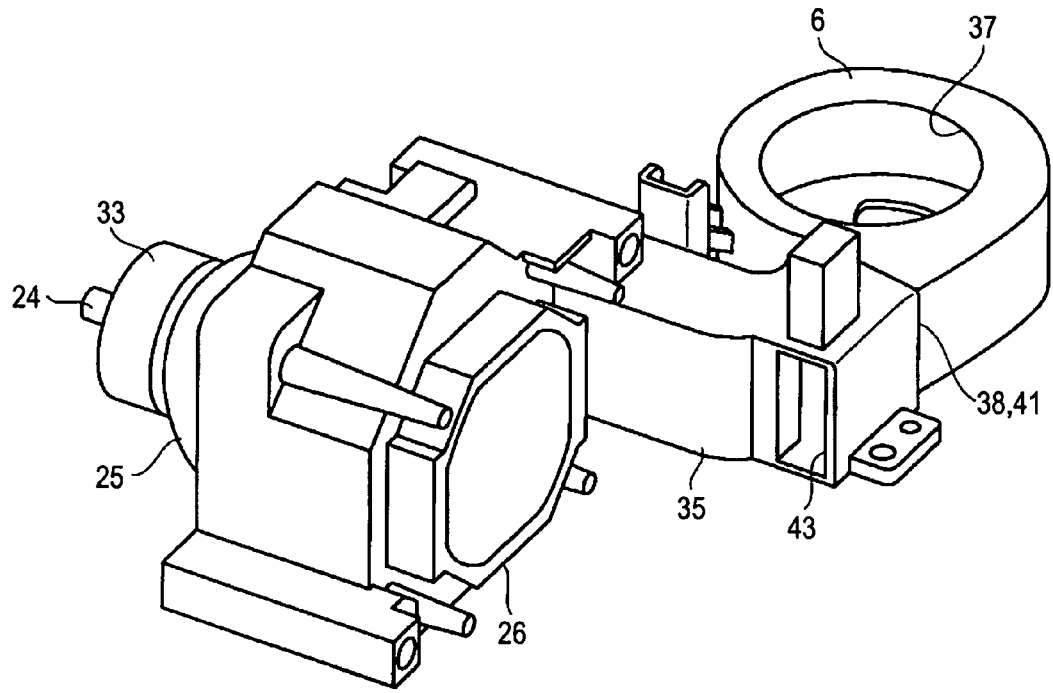
FIG. 4 is a perspective view of an illumination device and a cooling fan of the projector apparatus according to the embodiment of the invention.
Figure 5:
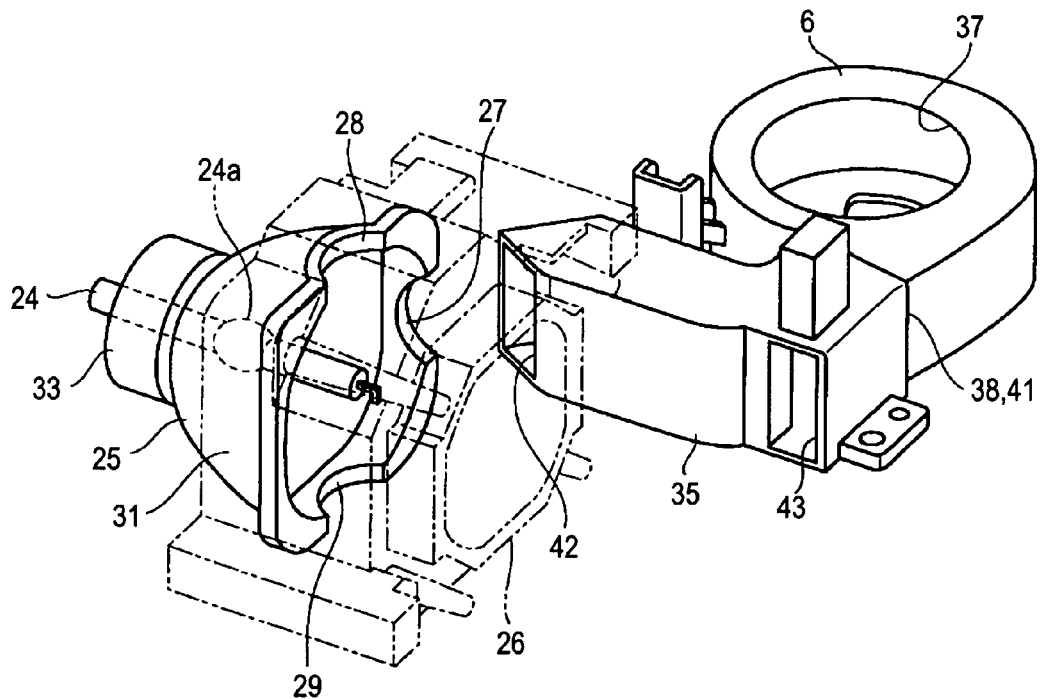
FIG. 5 shows a reflector and a light-emitting tube along with a casing of the illumination device in FIG. 4 represented by an imaginary line.
Figure 6:
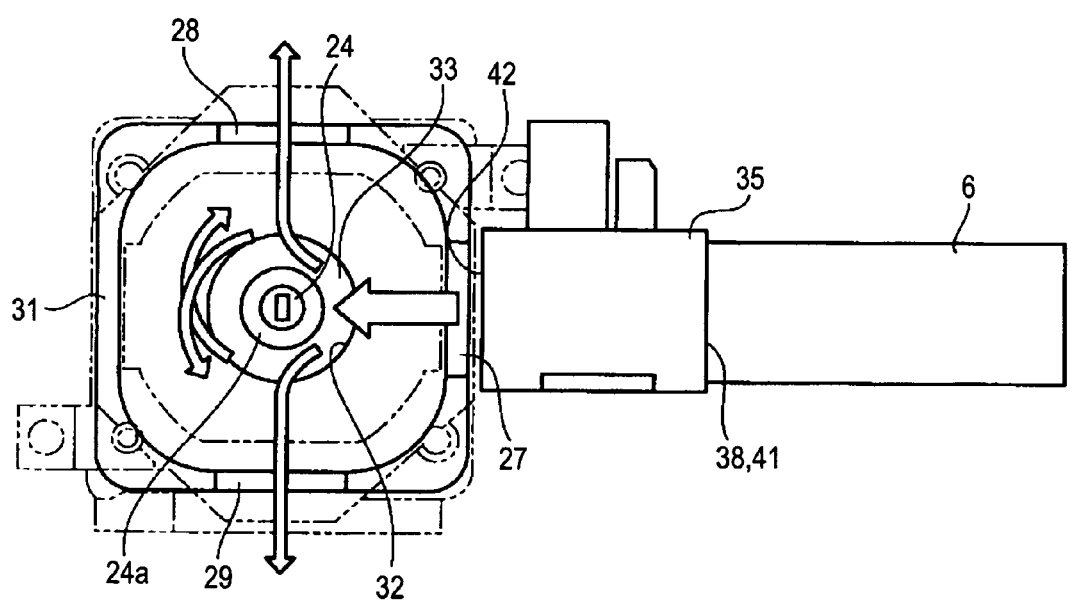
FIG. 6 is a front view of the illumination device and the cooling fan of the projector apparatus according to the embodiment of the invention.

As shown in FIGS. 4 to 6, the reflector 25 has a substantially semispherical shape which resembles an eggshell cut in half, and the reflector is formed from hard glass having high anti-heat properties. A substantially semispherical inner surface of the reflector 25 is a reflecting surface which is formed to reflect the illumination light emitted by the light-emitting tube 24 such that the light travels frontward substantially in parallel with an imaginary centerline of the reflecting surface. The substantially semispherical shape of the reflecting surface may specifically be a parabolic shape, elliptic shape, or a shape like a second order hyperbola.

Three arcuate recesses are provided on a front part of the reflector 25. An opening provided on the front side of the reflector 25 is closed by a light-transmitting member which is not shown. Thus, one intake port 27 and two discharging ports 28 and 29 are defined by the recesses on the front part of the reflector 25. An intake port 27 opens at a side part of the reflector 25, and a first air discharging port 28 opens at a top part of the reflector 25, the port opening in a direction perpendicular to the direction in which the intake port 27 opens. A second air discharging port 29 opens at a bottom part of the reflector 25, the port opening in another direction perpendicular to the direction in which the air intake port 27 opens. A side part 31 of the reflector opposite to the intake port 27 is a part of the wall forming the reflector. That is, the side part 31 is a closed part. A recess may alternatively be formed in the side part 31, and the recess may be closed by a separate member. When such a configuration is employed, a reflector having recesses opening in four directions according to the related art may be used as it is.

The light-transmitting member is disposed so as to cover the opening on the front side of the reflector 25 and is secured to the lamp housing 26. The light-transmitting member is formed from a hard material having high anti-heat properties which allows the illumination light emitted by the light-emitting tube 24 to pass. The lamp housing 26 is provided to hold the reflector 25. An intake-side flow path is provided in a part of the lamp housing 26 associated with the intake port 27, and discharge-side flow paths are provided in parts of the housing associated with the first discharging port 28 and the second discharging port 29, respectively.

A fitting hole 32 through which the light-emitting tube 24 is to be inserted is provided in a central part of the reflector 25 opposite to the light-transmitting member. A high-pressure mercury lamp serving as the light-emitting tube includes a glass tube made of quartz glass, and a light-emitting portion 24a in the form of an elliptical spherical shell (egg shell) is provided substantially in the middle of the glass tube. The light-emitting portion 24a may alternatively have a spherical shape or other shapes. A mounting member 33 is attached to the light-emitting tube 24, and the mounting member 33 is fitted into the fitting hole 32, whereby the light-emitting tube 24 is integrally mounted in the reflector 25. When the light-emitting tube 24 is mounted in the reflector 25, the light-emitting portion 24a is disposed substantially in the middle of the space in the reflector 25.

When air is taken in through the intake port 27 the air is immediately divided into upward and downward flows. The air may alternatively be divided after being agitated appropriately. Thus, a part of the air taken into the reflector 25 is discharged upwardly of the reflector 25 from the first discharging port 28 on the top side of the reflector. The remaining air is discharged downwardly of the reflector 25 from the second discharging port 29 on the bottom side of the reflector. The air discharged upwardly of the reflector 25 and the air discharged downwardly of the reflector 25 is discharged to the outside through the respective flow paths formed in the lamp housing 26.

The cooling fan 6 is disposed in a side-by-side relationship with the lamp housing 26 with a duct member 35 interposed between them. In the present embodiment, a Scirocco fan is used as the cooling fan 6. Although not shown, the cooling fan 6 includes a fan case, an electric motor contained in the fan dace, and an impeller provided on a rotating portion of the electric motor. The cooling fan 6 has a front portion and a rear portion which are provided in parallel with each other at a predetermined interval from each other and a circumferential portion provided so as to surround the periphery of the front portion and the rear portion. A circular suction port 37 having a great diameter is provided in the middle of the front portion. An air discharging port 38 is provided in a part of the circumferential portion which is perpendicular to the front portion.

A fixing portion of the electric motor is fixed inside the rear portion of the fan case of the cooling fan 6, and the impeller is provided on the rotating portion of the electric motor. A front side of the impeller faces the suction port 37, and a side portion of the impeller faces the air discharging port 38. When the electric motor is driven, the impeller interposed between the front portion and the rear portion of the fan case is driven for rotation, and a negative pressure is consequently generated in the fan case. External air is absorbed through the suction port 37 by the negative pressure generated in the fan case, and the direction of the air is changed at 90 deg by the rotation of the impeller. Then, the pressurized air moves in a tangential direction that is perpendicular to the in which the air is absorbed, whereby the pressurized air is discharged from the air discharging port 38.

The duct member 35 is a cylindrical member which provides communication between the air discharging port 38 of the cooling fan 6 and the intake port 27 of the reflector 25. At one (first) longitudinal end of the duct member 35, a first communication port 41 is provided in communication with the air discharging port 38. At the other longitudinal end of the duct member 35, a second communication port 42 is provided in communication with the intake port 27. Further, at the first longitudinal end of the duct member 35, a third communication port 43 is provided to distribute air to regions other than the reflector 25.

For example, the projector apparatus 1 having such a configuration operates as follows. When the power supply unit is turned on to supply electric power to the illumination device 5 and energize the light-emitting tube 24, the light-emitting tube 24 emits illumination light. The illumination light emitted by the light-emitting tube 24 travels through the color separation optical device 4 to be transmitted through the lens device 3, whereby an image enlarged to a predetermined size is displayed o the screen. Thus, it is possible to display a desired image on the screen in an enlarged scale.

Heat is emitted from the light-emitting tube 24 as the illumination light is emitted, and the air in the space in the reflector 25 is heated. The temperature of the light-emitting tube 24 is increased by the temperature rise in the reflector 25 and the heat emitted by the tube itself. When the light-emitting tube 24 is heated to an abnormally high temperature, the glass tube constituting the light-emitting tube 24 can be clouded or deformed, and the visibility of an image can consequently be reduced or completely lost. For this reason, measures must be taken to prevent an abnormal rise of the temperature of the light-emitting tube 24 or to keep the temperature of the light-emitting tube 24 appropriately low. The temperature of the light-emitting tube 24 is kept low by operating the cooling fan 6 to introduce air into the space inside the reflector 25.

In the present embodiment, when the cooling fan 6 is operated, air pressurized to a predetermined pressure is introduced into the intake port 27 of the reflector 25 from the air discharging port 38 of the cooling fan 6. The introduced air is air at a relatively low temperature which has been supplied to the apparatus housing 2 through the air intake window 15, and the air enters the space in the reflector 25. A part of the air comes into contact with the light-emitting tube 24 to decrease the temperature of the light-emitting tube 24. At the same time, the air which has entered the space absorbs some heat from the air surrounding the same and from the surface of the reflector 25. As a result, the introduced air which heated as thus described is discharged to the outside through the two discharging ports 28 and 29 of the reflector 25. Thus, the light-emitting tube 24 and the reflector 25 can be prevented from being heated to an abnormally high temperature, which allows an image projected on the screen to be kept clear.

In this case, the reflector 25 is provided with one intake port 27 and two discharging ports 28 and 29. Thus, the air discharging area is set substantially twice the air supplying area. As a result, air receives a smaller resistance at the air discharging side, and the load imparted to the electric motor of the cooling fan 6 can be kept small. It is therefore possible to drive the electric motor under a reduced load with the output of the motor kept at a relatively high value (which is about 1.5 times higher than that in the related art). As a result, the cooling efficiency of the light-emitting tube 24 can be improved to cool the light-emitting tube 24 effectively, whereby the life of the light-emitting tube 24 can be kept long.

As shown in FIG. 3, the air discharging fan 7 is disposed in the vicinity of the illumination device 5, which is a configuration similarly seen in projector apparatus according to the related art. In a projector apparatus according to the related art, a discharging port is provided on a surface of the apparatus facing an intake port of a reflector. Such a structure is significantly affected by suction performed by an air discharging fan. In case that the light-emitting tube is broken, pieces of glass can easily exit the reflector through the discharging port because of absorption by the air discharging fan, which is problematic in that the pieces of glass are likely to be discharged out of the apparatus housing through an air discharging window.

In the projector apparatus 1 according to the present embodiment, since the two discharging ports 28 and 29 are provided so as to open in directions perpendicular to the intake port 27 of the reflector 27, adverse effects of suction performed by the air discharging fan 7 can be suppressed at the discharging ports. Even if the light-emitting tube 24 is broken, pieces of glass can be kept less likely to exit the reflector 25 through the discharging ports 28 and 29 as a result of suction performed by the discharging fan 7. It is therefore possible to prevent or effectively suppress the occurrence of the problematic situation in which pieces of glass are absorbed by the air discharging fan 7 to be discharged out of the reflector 25 through the discharging ports 28 and 29 and are consequently discharged from the apparatus housing 2 through the air discharging window 16.

The invention is not limited to the embodiment described above, and various modifications may be made without departing from the spirit of the invention. For example, the embodiment has a configuration in which the two discharging ports 28 and 29 are disposed to open in directions perpendicular to the direction in which the intake port 27 opens. However, it is not required for the discharging ports to open in directions which are exactly 90 deg to the direction in which the intake port opens. A similar effect can be achieved if the discharging ports open in directions which are substantially perpendicular to the direction of the intake port (e.g., directions at about 90 plus or minus 5 deg to the direction of the intake port). Although an embodiment employing a Scirocco fan as the cooling fan 6 has been described, the invention is not limited to Scirocco fans. Other types of centrifugal blowers may obviously be used, and axial fans and mixed flow fans may alternatively be used.

It should be understood by those skilled in the art that various modifications, combinations, sub-combinations and alterations may occur depending on design requirements and other factors insofar as they are within the scope of the appended claims or the equivalents thereof.

What is claimed is:

1. A projector apparatus comprising:
an outer housing having (i) an air intake window on a first side of the outer housing, (ii) an air discharge window on a second side of the outer housing, (iii) a top surface, and (iv) a bottom surface which is opposite the top surface;
a light-emitting tube emitting illumination light;
a reflector arranged to cover at least a portion of a periphery of the light-emitting tube and formed so as to reflect the illumination light emitted by the light-emitting tube in a forward direction;
a cooling fan disposed beside the reflector for blowing cooling air on the light-emitting tube;
an apparatus housing containing the reflector and the cooling fan; and
an air discharging fan which is separate from the cooling fan,
each of the light-emitting tube, the apparatus with the reflector and the cooling fan, and the air discharging fan being disposed within the outer housing,
the air discharging fan disposed inward of the air discharge window of the outer housing for causing air to be taken in at the air intake window and discharged through the air discharge window,
the cooling fan having (i) a front portion, (ii) a rear portion provided in parallel with the front portion, (iii) a circumferential portion provided so as to surround a periphery of the front portion and the rear portion, and (iv) a circular suction port in the front portion,
the cooling fan being arranged (i) so as to be away from the air discharging fan, the air discharge window and the air intake window, and (ii) so that the front portion and the rear portion are parallel to the top surface or the bottom surface of the outer housing,
the reflector having (i) an intake port facing an air discharging port of the cooling fan, (ii) two discharging ports opening in direction which is within a range of plus and minus 5 degrees of perpendicular to the intake port, and (iii) a wall having a side part,
the two discharging ports of the reflector having a combined discharge area which is twice or substantially twice an intake area of the intake port of the reflector, and
the side part of the wall being arranged so as to face the second side of the outer housing and be opposite to the intake port.

2. The projector apparatus according to claim 1, wherein the intake port is provided at a side part of the reflector facing a side face of the apparatus housing; and
the two discharging ports are provided at a top part and a bottom part of the reflector perpendicular to the side part.

3. The projector apparatus according to claim 1, wherein the cooling fan is configured to cause pressurized air which is pressurized to a predetermined pressure to be introduced into the intake port of the reflector.

4. The projector apparatus according to claim 1, in which the first side of the outer housing is opposite to the second side of the outer housing so that the air intake window is on an opposite side of the outer housing to that of the air discharge window.

5. The projector apparatus according to claim 1, in which the side part of the wall is closed so as to not have any openings therein which face the second side of the outer housing and the intake port.

* * * * *